US008720464B2

(12) United States Patent
Kim et al.

(10) Patent No.: US 8,720,464 B2
(45) Date of Patent: May 13, 2014

(54) METHOD FOR CONTROLLING WATER SUPPLY AMOUNT AND REFRIGERATOR USING THE SAME

(75) Inventors: Youngjin Kim, Seoul (KR); Hoyoun Lee, Seoul (KR); Sungyong Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 529 days.

(21) Appl. No.: 12/902,427

(22) Filed: Oct. 12, 2010

(65) Prior Publication Data
US 2011/0083749 A1 Apr. 14, 2011

(30) Foreign Application Priority Data

Oct. 13, 2009 (KR) .................. 10-2009-0097401
Oct. 14, 2009 (KR) .................. 10-2009-0097907
Oct. 14, 2009 (KR) .................. 10-2009-0097908

(51) Int. Cl.
E03B 1/04 (2006.01)
(52) U.S. Cl.
USPC .............. 137/2; 137/10; 137/486; 137/487.5; 702/46; 340/508
(58) Field of Classification Search
USPC .......... 137/2, 10, 486, 487.5, 624.11; 702/46; 340/508
See application file for complete search history.

(56) References Cited

U.S. PATENT DOCUMENTS

| 4,581,946 A | * | 4/1986 | Kanayama ................. 73/861.77 |
| 4,724,865 A | * | 2/1988 | Hirano et al. ................. 137/486 |
| 4,899,131 A | * | 2/1990 | Wilk et al. ................... 340/518 |
| 5,086,806 A | * | 2/1992 | Engler et al. ................... 137/486 |
| 5,124,934 A | * | 6/1992 | Kawamoto et al. ........... 700/282 |
| 5,409,037 A | * | 4/1995 | Wheeler et al. ............... 137/551 |
| 5,551,598 A | * | 9/1996 | Cutsinger ........................ 222/52 |
| 5,813,246 A | * | 9/1998 | Oh ................................... 62/391 |
| 5,816,448 A | * | 10/1998 | Kobold ........................... 222/36 |
| 6,092,374 A | * | 7/2000 | Kang et al. ......................... 62/74 |

(Continued)

FOREIGN PATENT DOCUMENTS

| KR | 10-2005087530 A | 8/2005 |
| KR | 10-2006068747 A | 6/2006 |
| KR | 10-2008076654 A | 8/2008 |
| KR | 10-2009036188 A | 4/2009 |

OTHER PUBLICATIONS

PCT International Search Report and Written Opinion dated May 23, 2011, for Application No. PCT/KR2010/007002, 9 pages.

*Primary Examiner* — John K Fristoe, Jr.
*Assistant Examiner* — Minh Le
(74) *Attorney, Agent, or Firm* — Fish & Richardson P.C.

(57) ABSTRACT

A method for controlling a water supply amount and a refrigerator using the same are disclosed. The method includes receiving information regarding a water supply amount selected by a user, counting a duration after starting water supply, and checking whether an error in a water supply amount measurement unit exists. When the water supply amount measurement unit is normal, an actual water supply amount is determined based on a signal from the water supply amount measurement unit, and, when a fault exists, a water supply amount is determined based on correlation between a stored water supply amount for normal operation and a water supply duration. Water supply is stopped when the selected water supply amount and the determined water supply amount are equal. When the water supply amount measurement unit is normal, the signal from the water supply amount measurement unit and information regarding a water supply duration are stored.

15 Claims, 10 Drawing Sheets

(56) References Cited

U.S. PATENT DOCUMENTS

| | | | |
|---|---|---|---|
| 6,205,409 B1 * | 3/2001 | Zvonar | 702/183 |
| 6,209,576 B1 * | 4/2001 | Davis | 137/487.5 |
| 6,725,167 B2 * | 4/2004 | Grumstrup et al. | 702/47 |
| 7,204,270 B2 * | 4/2007 | Hendrix | 137/624.12 |
| 7,306,115 B2 * | 12/2007 | Beachy | 222/20 |
| 2006/0180206 A1 * | 8/2006 | Gheorghe et al. | 137/487.5 |
| 2009/0090123 A1 | 4/2009 | Son et al. | |
| 2010/0063752 A1 * | 3/2010 | Lee | 702/46 |
| 2010/0065126 A1 * | 3/2010 | Segal | 137/1 |
| 2011/0214744 A1 * | 9/2011 | Khorshid | 137/2 |

\* cited by examiner

METHOD FOR CONTROLLING WATER SUPPLY AMOUNT AND REFRIGERATOR USING THE SAME

BACKGROUND

1. Field

The present disclosure relates to a method for controlling a water supply amount and a refrigerator using the same and, more particularly, to a method for controlling water such that water as much as selected by a user is supplied through a water supply device, and a refrigerator having a water supply device using the control method.

2. Description of the Related Art

In general, a refrigerator is a device, including a refrigerator main body including storage spaces such as a freezing chamber, a refrigerating chamber, a vegetable chamber, and the like, a refrigerating cycle device provided in the interior of the refrigerator main body and maintaining the storage spaces at a pre-set temperature, and a door mounted at one side of the refrigerator main body and opening and closing the storage spaces, in order to keep food items such as meat, fish, vegetable, fruits, beverages, and the like in a fresh state.

Thus, improving food item storage performance, reducing the energy consumption required in the process of keeping food items, or easily keeping a larger amount of food items in storage within the same space have been the main subjects in developing refrigerators. However, recently, various other functions than the simple storage function are required for refrigerators, and there have been various attempts to meet the demand.

A dispenser is one of constituent element installed in a refrigerator in order to meet the demand, which simply provides water from a tank stored in the refrigerator or from an external water source without having to open the door of the refrigerator. Recently, besides water dispenser, an ice dispenser for supplying ice is also used.

The dispenser starts to supply water when the user presses a water supply button by using a cup or his hand. In general, water is supplied from the dispenser while the user is pressing the water supply button, but a certain type of dispenser has a function of supplying water by a pre-set capacity. Such a dispenser having the function of adjusting the water supply amount includes a measurement unit for measuring the amount of supplied water and a controller for checking the amount of water measured by the measurement unit and controlling a water supply valve.

The dispenser having such a structure needs to accurately measure the amount of water, and in this case, a flow sensor is generally used as the water supply amount measurement unit. In the flow sensor, generally, a small rotor is installed at an inner side of a water supply flow path and the number of pulses is measured by using a Hall effect element that generates pulses in proportion to the number of rotations of the rotor, by which the amount of water supply is directly measured. Besides, various types of flow sensors may be used, and these sensors generally include an element which operates mechanically correspondingly according to a flow rate, so if they are used for a long period of time, they are likely to malfunction.

In particular, when debris included in the supplied water is captured by more than a certain amount by the rotor or the like, an accurate measurement is not possible. Thus, water supply by the pre-set amount cannot be properly performed, degrading the reliability and user convenience of the devices.

SUMMARY

Therefore, in order to address the above matters, the various features described herein have been conceived.

An aspect of the present disclosure provides a method for controlling a water supply amount capable of supplying a pre-set amount of water through a dispenser even when there is a fault in a flow sensor.

Another aspect of the present disclosure provides a refrigerator having a dispenser capable of supplying water by the amount selected by a user even when there is a fault in a flow sensor.

According to an aspect of the present disclosure, there is provided a method for controlling a water supply amount including: receiving information regarding a water supply amount selected by a user; counting a required duration after starting water supply; checking whether or not there is an error in a water supply amount measurement unit; when the water supply amount measurement unit is normal, determining an actual water supply amount on the basis of a signal from the water supply amount measurement unit, and when there is a fault in the water supply amount measurement unit, determining an actual water supply amount on the basis of the correlation between a stored water supply amount for the normal operation and a water supply duration; when the selected water supply amount and the actual water supply amount are equal, stopping water supply; and when the water supply amount measurement unit is normal, storing the signal from the water supply amount measurement unit and information regarding a water supply duration.

In the above aspect of the present disclosure, when there is a fault in water supply amount measurement unit for measuring the amount of actually supplied water in the process of supplying water by an amount selected by a user or by a pre-set amount, a water supply duration is measured to indirectly determine the amount of actually supplied water. Thus, even when the water supply amount measurement unit has an error, water can be normally supplied. Here, the relationship between the water supply duration and the actual water supply amount may be determined by using information obtained when the water supply amount measurement unit is in a normal state and stored.

Namely, when a sort of database is established by storing the water supply amount selected in the normal state and a corresponding signal from the water supply amount measurement unit, and a water supply duration, the relationship between the water supply amount and the water supply duration can be analogized on the basis of the database. The relationship is derived from information reflecting all the external factors such as a water pressure of an area where the dispenser having the water supply unit is installed, so even when the water supply amount measurement unit has an error, a relatively accurate water supply amount can be measured only with the water supply duration.

In this case, the correlation may be derived by averaging the entire database information, or the correlation may be derived only by using some information which has been recently stored.

Here, the water supply amount measurement unit may generate a pulse signal in proportion to a flow velocity or the supplied water. In this case, in determining whether or not the water supply amount measurement unit is normal, whether or not the water supply amount measurement unit is normal may be determined according to the presence or absence of a pulse signal from the water supply amount measurement unit. Namely, when the water supply amount measurement unit itself is damaged or a signal transmission cable is damaged, a pulse signal cannot be generated from the water supply amount measurement unit or a generated pulse signal cannot be transmitted, so when there is no pulse signal, it may be determined that the water supply amount measurement unit has an error.

In addition, in determining whether or not the water supply amount measurement unit is normal, when the number of pulse signals from the water supply amount measurement unit is smaller than a pre-set number, it may be determined that the water supply amount measurement has an error. Namely, as for a pulse signal transmission, when it is assumed that at least ten or more pulse signals per second must be transmitted for a normal operational state, if one to three pulse signals per second are transmitted, it may be determined that the water supply amount measurement unit has an error.

The initiation or stopping of the water supply may be performed by turning on or off a water supply valve.

A signal from the water supply amount measurement unit, which is stored after the water supply is terminated, may include the number of pulse signals transmitted from the water supply amount measurement unit from a point in time at which water supply was initiated to a point at which the water supply was terminated.

According to another aspect of the present disclosure, there is provided a method for controlling water supply such that water by a water supply amount selected by a user is supplied through a dispenser, including: receiving information regarding a water supply amount selected by a user; initiating water supplying; counting a required duration after initiating water supply; when it is determined that a water supply amount measurement unit was normal during a previous water supply session, determining an actual water supply amount on the basis of a signal from the water supply amount measurement unit, and when it is determined that the water supply amount measurement unit has an error, determining the actual water supply amount on the basis of the correlation between the stored water supply amount for a normal operation and a water supply duration; when the selected water supply amount and the actual water supply amount are equal, stopping water supply; storing a signal from the water supply amount measurement unit with respect to a water supply amount selected when the water supply amount measurement unit is normal and water supply duration; comparing the correlation between the stored water supply duration and the signal from the water supply amount measurement unit with previously stored information; and determining whether or not the water supply amount measurement unit is normal according to the comparison result of the stored information and the previously stored information.

In this aspect of the present disclosure, whether or not the water supply amount measurement unit is normal by comparing the signal from the water supply amount measurement unit and the actually required water supply duration after the water supply is completed. Thus, whether or not the water supply amount is not can be checked without initiating water supply in a water supply state which would happen later. Accordingly, the occurrence of a situation in which the user performs operation without the knowledge of the fact that the water supply amount measurement unit has an error can be prevented, and thus, an excessive amount of water can be prevented from being supplied.

According to another aspect of the present disclosure, there is provided a method for controlling a water supply amount of a dispenser having a water supply amount measurement unit, a water supply unit, a controller and a storage unit, including: when the water supply amount measurement unit is normal, measuring an actual water supply amount through the water supply amount measurement unit, and when the water supply amount measurement unit has an error, determining an actual water supply amount through a duration in which water is supplied through the water supply unit.

Here, the method may further include: storing information regarding the water supply duration with respect to the water supply amount and the information regarding the signal from the water supply amount measurement unit.

The method may further include: determining whether to the water supply amount measurement normally operates by comparing the information stored in the previous watery supply session and newly stored information.

The method may further include: when it is determined that the water supply amount measurement unit has an error, visually or audibly displaying the corresponding information.

According to another aspect of the present disclosure, there is provided a refrigerator having a water supply device, including: a water supply device configured to supply water by an amount selected by a user or by a preset amount; a water supply valve configured to open and shut a water supply flow path installed in the water supply device; a water supply amount measurement unit installed in the water supply flow path and measuring the amount of water supplied through the interior of the water supply flow path; a timer configured to measure an opening or closing time of the water supply valve; a controller configured to control the water supply valve such that a water supply amount selected upon receiving a signal from the timer or a pre-set water supply amount; and a storage unit configured to store a signal from the water supply amount measurement unit and the timer, wherein the controller determines whether or not the water supply amount measurement unit has an error, and when the water supply amount measurement unit has an error, the controller determines an actual water supply amount through a water supply time measured by the timer.

Here, the water supply amount measurement unit may include: a rotor installed in the interior of the flow path and rotating according to a contact with water; and a signal generation unit configured to generate a pulse signal corresponding to the number of rotations of the rotor.

The water supply device may include a water supply amount selection unit allowing the user to select a water supply amount. The water supply amount selection unit may include a plurality of buttons disposed on a front side of a dispenser provided on the refrigerator main body or on a refrigerator door, and each button may be used to select mutually different water supply amount.

The controller may determine whether or not the water supply amount measurement unit has an error by comparing information regarding a previous water supply stored in the storage unit and newly inputted information.

When a pulse signal transmitted from the water supply amount measurement unit before water supply starts is smaller than a pre-set number, the controller may determine that the water supply amount has an error.

Whether or not the water supply amount measurement unit has an error may be determined on the basis of a signal transmitted from the water supply amount measurement unit. Namely, when a flow sensor that generates a pulse signal corresponding to a water supply amount is used as the water supply amount measurement unit, whether or not the flow sensor has an error by performing steps of: measuring the period of a pulse signal transmitted from the flow sensor; and comparing the measured pulse period and a pre-set reference pulse period.

Namely, by measuring the period between the respective pulse signals, rather than the number of pulse signals measured during a certain period of time after water supply starts, whether or not the flow sensor has an error can be quickly and accurately measured. Namely, unlike the related art in which the normal operation is determined when the number of pulse signals transmitted during a certain period of time is a certain number or larger regardless of the period of the pulse signals, in the aspect of the present disclosure, the period of pulses to determine whether or not there is an error immediately after water supply starts, and also whether or not there is an error can be measured on the basis of a deviation of the pulse periods measured between the respective pulse signals, thus performing accurate determination.

Here, the period of the pulse signal may be measured by using a certain number of pulse signals which are successively transmitted. Here, the certain number may be 2.

The measuring of the pulse period and the determining of whether or not the flow sensor has an error are repeatedly performed until such time as a water supply is terminated, whereby an error occurring in the course of water supply as well as the initial stage of water supply can be detected. Of course, the measuring of the pulse period and the determining of whether or not the flow sensor has an error may be repeatedly performed continuously without any time interval, or may be repeatedly performed at certain time intervals.

Meanwhile, although the water supply amount is controlled on the basis of the pre-set information, water supply may not be accurately performed due to an error of the water supply amount measurement itself or a difference in an installation environment of the water supply amount measurement unit, so a unit for correcting it later may be additionally provided. Namely, information regarding a signal to be transmitted from the water supply amount measurement unit when the water supply amount selected by the user or the pre-set water supply amount may be additionally stored, information correction unit for changing the information stored in the storage unit may be additionally included, so that a reference value for checking whether or not water supply has been completed can be changed through the correction unit.

In this case, the information correction unit may be disposed on a front surface of the water supply device. For example, the information correction unit may be installed on a refrigerator main body, a dispenser, or the like.

Here, the water supply amount measurement unit may generate a pulse signal in proportion to the water supply amount supplied through the water supply device, and the controller may control the water supply amount by comparing the number of actually transmitted pulse signals and the information stored in the storage unit.

With such a configuration as described above, even when the water supply amount measurement unit has an error, water supply by the amount selected by the user or by a pre-set amount can be provided, so the reliability of the product can be improved.

The foregoing and other objects, features, aspects and advantages of the present disclosure will become more apparent from the following detailed description when taken in conjunction with the accompanying drawings.

DETAILED DESCRIPTION

A method for controlling a water supply amount and a refrigerator having a dispenser using the water supply amount control method according to exemplary embodiments will now be described with reference to the accompanying drawings.

Figure 1:
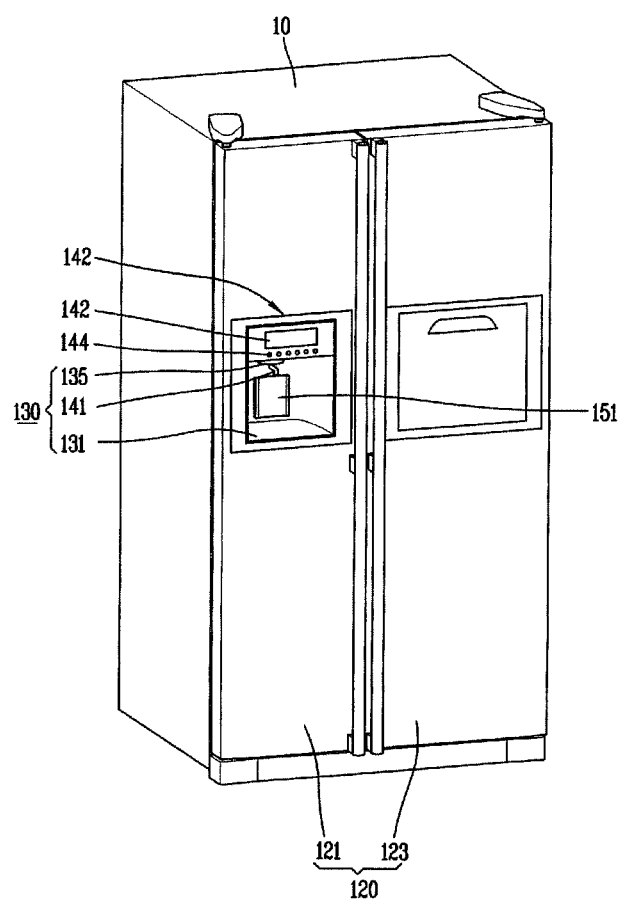
FIG. 1 is a perspective view showing an example of a refrigerator employing a method for controlling a water supply amount.

FIG. 1 is a perspective view showing an example of a refrigerator employing a method for controlling a water supply amount according to an exemplary embodiment. Here, the disclosed techniques are not limited thereto and may be applicable to any device having a water supply unit for supplying water by the amount selected by the user.

With reference to FIG. 1, the refrigerator 100 may include a main body 110 including a storage space formed therein, a door 120 coupled to the main body 110 to open and shut the front opening of a cooling chamber, and a dispenser 130 installed on the door 120. The cooling chamber includes a freezing chamber and a refrigerating chamber disposed left and right with a separation therebetween. The door 120 includes a freezing chamber door 121 and a refrigerating chamber door 123 rotatably mounted at the main body 110 and opening and closing the freezing chamber and the refrigerating chamber.

The dispenser 130 is installed on the front surface of the freezing chamber door 121 in order to allow a user to take out water and/or ice. The dispenser 130 may include a dispenser casing 131 having an accommodation space 132 therein and insertedly coupled to the interior of the freezing chamber door 121 such that its front side is exposed, an ice withdrawal part 135 from ice stored in the interior of the freezing chamber can be drawn out, and a water supply unit 141 for withdrawing water stored in the interior of the refrigerating chamber. A manipulation lever 151 is installed as a manipulation means on a rear surface of the water supply unit 141 to allow water to be supplied through the water supply unit 141.

A manipulation panel 140 is installed at an upper portion of the dispenser 130 and includes a display window 142 for displaying an operational state of the refrigerator and a state set by the user and manipulation buttons 144 for manipulating the functions of the refrigerator. Here, the manipulation buttons 144 include a water supply amount select button 144a for selecting a water supply amount desired to be drawn out by the user, a water supply amount increase or decrease button (to be described) positioned at the side of the water supply amount select button, and a correction mode select button 144c disposed to be adjacent to the water supply amount increase or decrease button 144b. The respective buttons will be described later.

Figure 2:
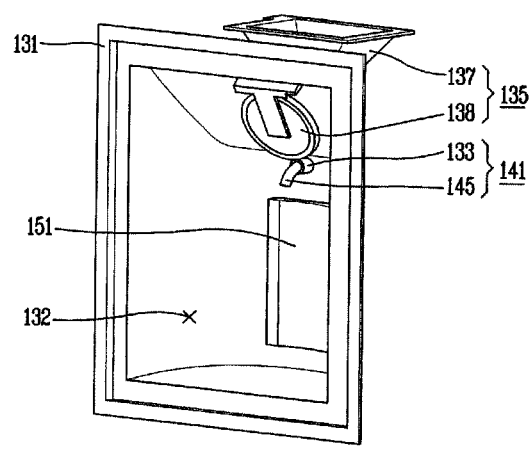
FIG. 2 is an enlarged perspective view showing a dispenser part of FIG. 1.
Figure 3:
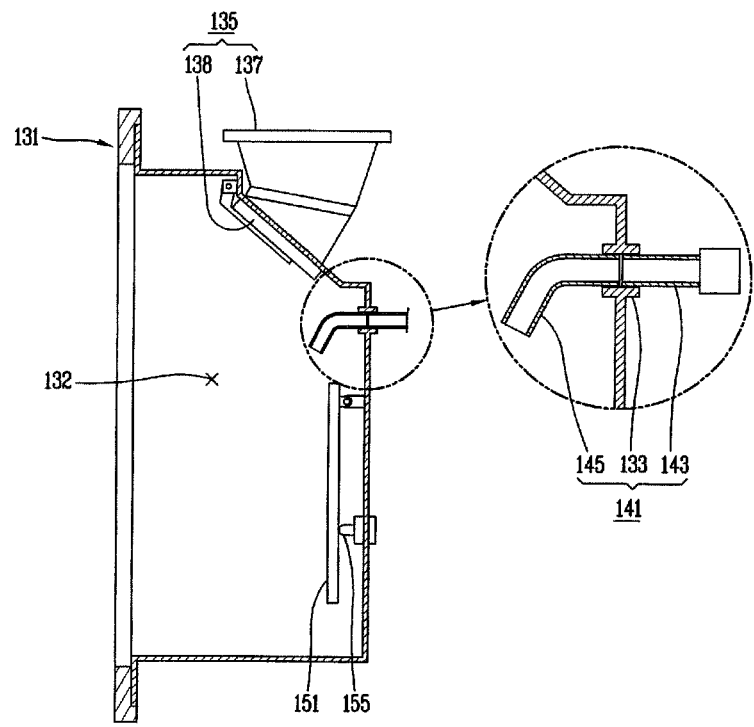
FIG. 3 is a sectional view showing the dispense illustrated in FIG. 2.

FIG. 2 is an enlarged perspective view showing a dispenser part of FIG. 1, and FIG. 3 is a sectional view showing the dispense illustrated in FIG. 2.

With reference to FIGS. 2 and 3, an ice withdrawal part 135 is formed at an upper area of a dispenser casing 131, and a water supply part 141 is formed at a lower side of the ice withdrawal part 135. The ice withdrawal part 135 may include a shoot 137 for guiding ice and an opening and closing member 138 for opening and closing the shoot 137.

The water supply unit 141 includes a water supply pipe 141 connected to a water supply tank (not shown) positioned in the interior of the refrigerating chamber or the freezing chamber, a coupling part 133 formed at the dispenser casing 131 allowing the water supply pipe 143 to be insertedly coupled, and a guide tube 145 coupled to the coupling part 133 to guide water to be dropped from a certain position. Although not shown, a flow sensor for measuring the amount of water supplied through the water pipe 143 and a water supply valve for controlling the flow of water within the water supply pipe 143 may be additionally installed at the water supply pipe 143. Meanwhile, a manipulation lever 151 for manipulating withdrawing of water and a switch 155 are provided at a lower side of the guide pipe 145 of the water supply pipe 143.

Figure 4:
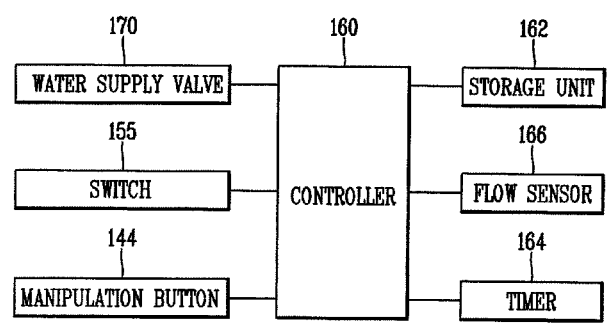
FIG. 4 is a schematic block diagram showing the configuration of a controller of the refrigerator illustrated in FIG. 1.

FIG. 4 is a schematic block diagram showing the configuration of a controller of the refrigerator illustrated in FIG. 1. With reference to FIG. 4, a controller 160 for controlling the operations of the refrigerator and the dispenser is connected to the manipulation button 144 and the switch 155, through which the user inputs an instruction to allow the controller 160 to perform a selected function.

Meanwhile, the controller 160 includes a storage unit 162 for storing various information required for operating the refrigerator or the dispenser and a timer 164 for counting an operation time or the like of each device. In addition, the controller 160 is also connected to the flow sensor 166 and the water supply valve 170 to control opening and closing of the water supply valve by using a signal regarding a water supply amount transferred from the flow sensor.

Here, the flow sensor may include a rotor installed in the interior of the water supply flow path and rotated by a flow of supplied water and a pulse generation unit for generating pulse signals corresponding to the number of rotations of the rotor.

A substantial configuration or position of the water supply pipe are not necessarily limited to the illustrated one, and the water supply pipe may include a certain means for supplying water into the internal space of the dispenser casing, and the ice withdrawal part 135 may be omitted.

Meanwhile, the dispenser 130 may supply water according to two types of methods. In the first method, water is supplied only when the user presses the manipulation lever 151 by using a cup. In this case, although a pulse signal is transmitted from the flow sensor 166 to the controller, but regardless of this, the controller 160 may open the water supply valve 170 upon detecting that the switch 155 is pressed by the manipulation lever 151, and when the switch 155 returns to its original positioned as the user takes out his cup, the water valve 170 is shut.

In the second method, only the water supply amount select button among the manipulation buttons 144 is pressed to supply water by a corresponding water supply amount. In this case, the flow sensor 166 operates to generate pulse signals, and the controller 160 determines the amount of actually supplied water on the basis of the number of the generated pulse signals. The number of pulse signals is proportional to a flow velocity of water through the water supply tube, and the section of the water supply tube is a given value, so the amount of actually supplied water can be accurately measured on the basis of such information.

In this case, a plurality of water supply amount select buttons corresponding to different water supply amounts may be provided to allow the user to select an appropriate amount of water as necessary, or a single water supply button may be provided, so when the single water supply button is pressed, water may be supplied by a pre-set amount. Replacing of the water supply button with a manipulation lever may be considered. In this case, when the manipulation lever is being pressed, water may be supplied according to the foregoing first method, and when the manipulation lever is pressed once, a determined amount of water may be supplied.

Figure 5:
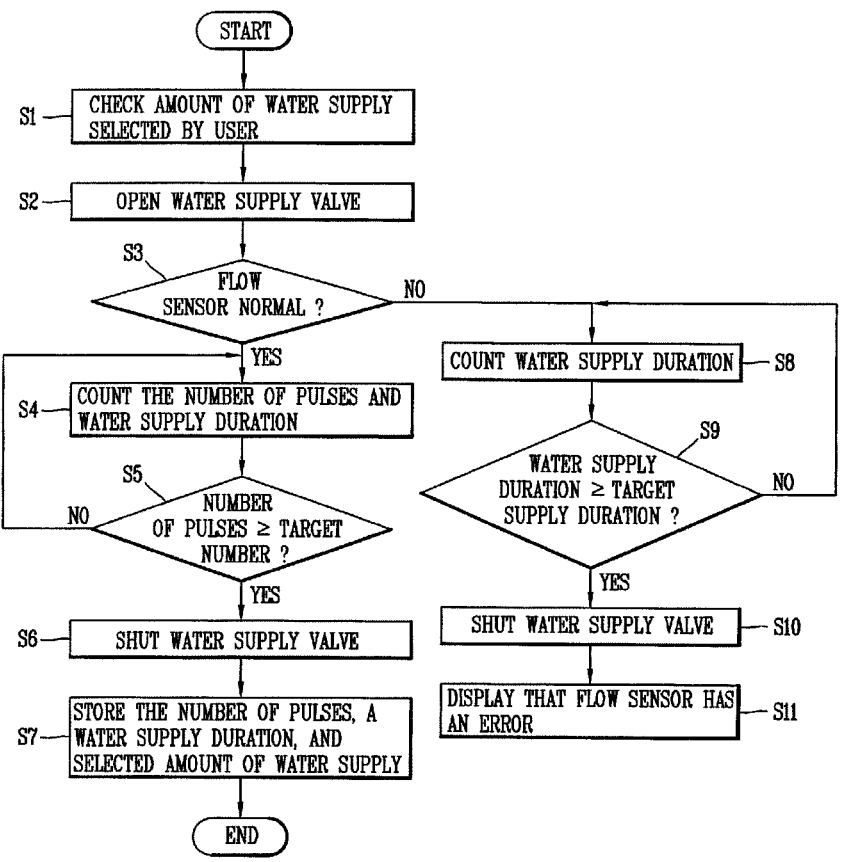
FIG. 5 is a flow chart illustrating the process of a method for controlling a water supply amount of the refrigerator illustrated in FIG. 1.

FIG. 5 is a flow chart illustrating the process of a method for controlling a water supply amount of the refrigerator illustrated in FIG. 1. With reference to FIG. 5, when the user presses one of the water supply amount select buttons, the controller 160 checks a selected water supply amount and reads a pertinent number of pulses from the storage unit (step S1). In this case, the pertinent number of pulses may be previously determined through the diameter of the water supply tube and dimensions of the flow sensor and determined by using the value stored in the storage unit in a manufacturing stage. Thereafter, the controller 160 may open the water supply valve 170 to start water supply (step S2), and check whether or not the flow sensor has an error (step S3).

In step S3, the controller 160 may check whether or not the flow sensor has an error according to the presence or absence of a pulse signal from the flow sensor. Namely, when the flow sensor is damaged so the rotor cannot rotate or when a signal transmission cable is damaged, a pulse signal cannot be generated from the water supply amount measurement unit or a generated pulse signal cannot be transmitted, so when there is no pulse signal, it may be determined that the flow sensor has an error.

In addition, when the number of pulse signals transmitted from the flow sensor is smaller than a pre-set number, it may be determined that the flow sensor has an error. Namely, as for a pulse signal transmission, when it is assumed that at least ten or more pulse signals per second must be transmitted for a normal operational state, if one to three pulse signals per second are transmitted, it may be determined that the water supply amount measurement unit has an error.

When it is determined that the flow sensor is in a normal state, the number of pulse signals from the flow sensor and a time which has lapsed from a point in time at which the water supply valve was open, while water is kept to be supplied, are counted by the timer 164 (step S4). It is checked whether or not the number of pulse signals is larger than a target number corresponding to the selected water supply amount (step S5). When the number of pulse signals is larger than the target number, the water supply valve is shut (step S6), the information regarding the water supply amount selected by the user, the measured number of pulse signals, and a water supply duration are stored in the storage unit (step S7), and the water supply process is terminated.

By repeatedly performing the water supply process, the information regarding a plurality of times of water supplies can be stored in the storage unit, and the stored information may be processed to derive the correlation between the selected water supply amount and the water supply duration. In this case, the used information may be every information which has been selected while the dispenser is being used, or may be only information during a recent certain period, e.g., during one week. The thusly derived correlation may be used when it is determined that the flow sensor has an error.

Namely, when it is determined that the flow sensor has an error in step S3, the water supply duration is counted by the timer (step S8). Thereafter, it is checked whether or not the water supply duration has exceeded a target water supply duration with respect to the selected water supply amount (step S9). When the water supply duration has exceeded the target water supply duration, the water supply valve is shut (S10), the fact that the flow sensor has an error is displayed through the display window (step S11), and the water supply process is then terminated.

Here, the target water supply duration may be derived on the basis of the correlation between the water supply amount stored in the previous normal water supply process and the water supply duration. The correlation may simply be an average value of ratios between the water supply amounts and the water supply durations, or may be estimated by utilizing a statistical scheme such as a method of least squares.

Figure 6:
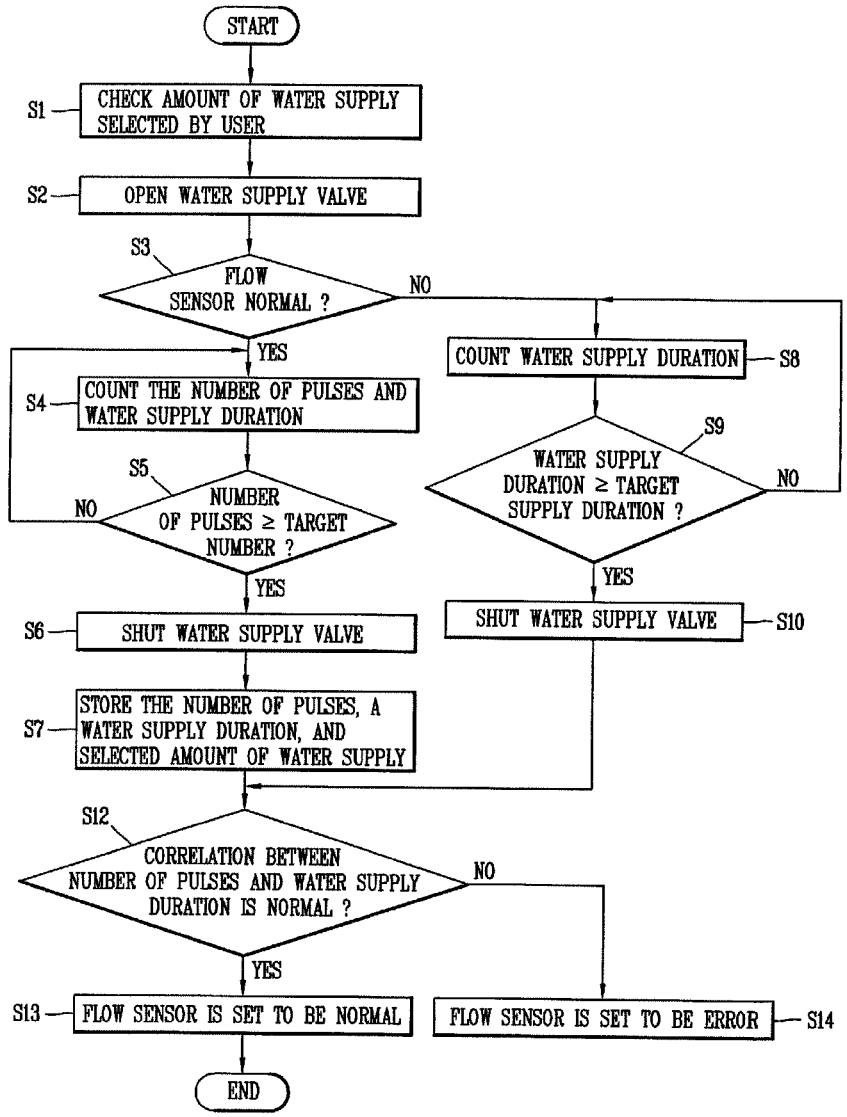
FIG. 6 is a flow chart illustrating the process of another example of a method for controlling a water supply amount of the refrigerator illustrated in FIG. 1.

FIG. 6 is a flow chart illustrating the process of another example of a method for controlling a water supply amount of the refrigerator illustrated in FIG. 1. The method illustrated in FIG. 6 is basically the same as the control method illustrated in FIG. 5. In detail, step S1 to step S10 in FIG. 5 are also performed in the control method illustrated in FIG. 6, and the control method of FIG. 6 is different from that of FIG. 5 in that step S12 for comparing the number of pulse signals measured in the water supply process and a water supply time taken until when a water supply is completed is performed after the step S7 or S10.

In step S12, the relationship between the number of pulse signals and the water supply duration which have been previously stored is derived and then compared with the number of pulse signals and the water supply duration generated during the current water supply process to check again whether or not the flow sensor is normal. Of course, whether or not the flow sensor is normal is checked in step S3, but in this case, it may be determined that the flow sensor has an error due to a temporary error or an error of a different element, not the flow sensor, or conversely, it may be determined that the flow sensor is normal in spite of the presence of an error in the flow sensor. Thus, whether or not the flow sensor is normal is checked on the basis of the information obtained during the actual water supply process.

The state of the flow sensor checked in step S12 is stored in the storage unit in steps S13 and S14. The thusly stored information may be used to check whether or not the flow sensor is normal when water is supplied afterward. Namely, whether or not the flow sensor is normal may be determined on the basis of the previously recorded state of the flow sensor, without having to check the state of the flow sensor, or after the state of the flow sensor is checked, it may be compared with the previously recorded state information of the flow sensor to thus check the state of the flow sensor collectively.

The water supply amount select button 144b will now be described. The storage unit stores information regarding a water supply amount which may be selected by the water supply amount select button 144b or information regarding the number of target pulses corresponding to a previously set water supply amount which is to be supplied when the manipulation lever is pressed once. The stored information may be compared with the number of pulse signals transmitted from the flow sensor when water is actually supplied, or whether or not water has reached the pre-set water supply amount may be determined by the controller.

The number of target pulses with respect to each of the water supply amounts stored in the storage unit may be adjusted by the water supply amount increase or decrease button 144b. The adjustment process may be performed in order to correct a differentiation of the water supply amount with respect to the same number of pulse signals according to an error of the flow sensor or an installation environment, the adjustment process may be performed according to a user selection when a product is installed or when the produce is used for a certain period.

Figure 7:
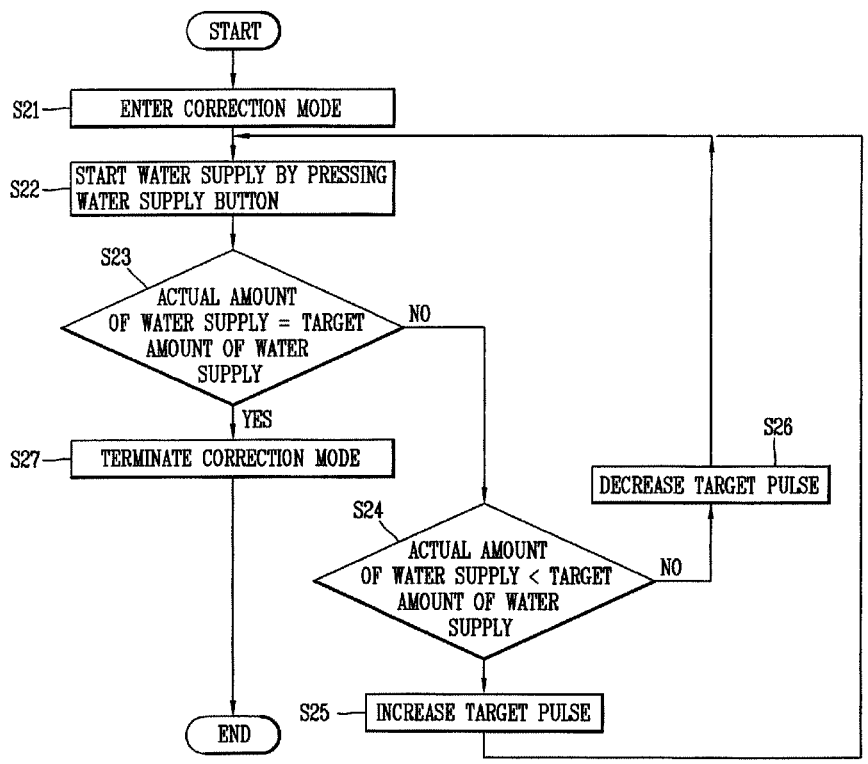
FIG. 7 is a flow chart illustrating the process of correcting a water supply amount of the refrigerator illustrated in FIG. 1.

FIG. 7 is a flow chart illustrating the process of correcting a water supply amount of the refrigerator illustrated in FIG. 1. With reference to FIG. 7, when the correction mode select button 144c is pressed by the user or an installation mechanic in order to perform the adjustment process, the controller enters a correction mode for changing a target pulse value stored in the storage unit (step S21).

In this state, when the user selects some of the water supply amount select buttons, water supply starts (step S22) and the amount of actually supplied water is compared with a selected target water supply amount (steps S23 and S24). When the amount of actually supplied water is smaller than the target water supply amount according to the comparison result, the water supply amount increase or decrease button 144b is manipulated to increase the number of target pulses stored in the storage unit (step S25), and in otherwise case, the number of target pulses is decreased (step S26).

The steps S21 to S26 are repeatedly performed, and when the amount of actually supplied water is equal to the target water supply amount, the correction mode select button 144c may be pressed to terminate the correction mode (step S27). Through this process, the amount of correction of the number of the target pulses in consideration of the error of the single product of the flow sensor and an environment variable can be obtained, and the thusly obtained correction amount may be equally applied to every water supply amount that may be selected by the user, whereby water can be supplied accurately in consideration of an error. Here, steps S22, S25 and S26 may be automatically performed by the controller although the user does not select them, and the user may input only the comparison results obtained by comparing the actual water supply amount and the target water supply amount through the manipulation button.

Figure 8:
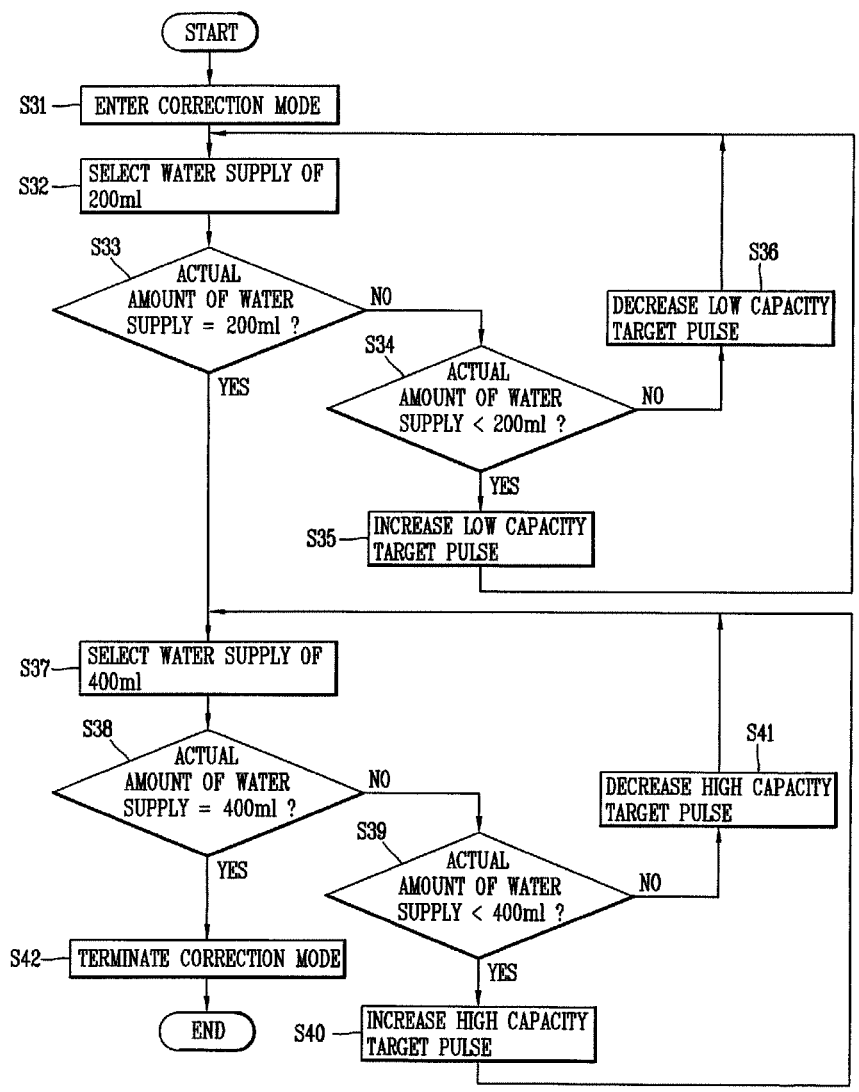
FIG. 8 is a flow chart illustrating another example of a process of correcting a water supply amount of the refrigerator illustrated in FIG. 1.

Also, the error of the flow sensor may vary depending on whether or not the water supply amount is large or small, so the correction operation may be performed according to two or more water supply amounts, respectively. FIG. 8 is a flow chart illustrating another example of a process of correcting a water supply amount of the refrigerator illustrated in FIG. 1. With reference to FIG. 8, when the correction mode select button 144c is pressed by the user, the controller enters the correction mode for changing the target pulse value stored in the storage unit (step S31).

In this state, when the user selects one of the selectable water supply amounts (200 ml in FIG. 8) (step S32), the controller performs water supply on the basis of the information stored in the storage unit. Thereafter, the actual water supply amount and the target water supply amount are compared (steps S33 and S34). When the actual water supply amount is smaller than the target water supply amount, the number of target pulses with respect to the corresponding water supply amount stored in the storage unit is adjusted to be increased (step S35), and when the actual water supply amount is larger than the target water supply amount, the number of target pulses with respect to the corresponding water supply amount stored in the storage unit is adjusted to be decreased (step S36).

This process may be repeatedly performed, and when the actual water supply amount is equal to the target water supply amount and the user selects one of the selectable water supply amounts (400 ml in FIG. 8) (step S37), the controller performs water supply on the basis of the information stored in the storage unit. Thereafter, the actual water supply amount and the target water supply amount are compared (steps S38 and S39). When the actual water supply amount is smaller than the target water supply amount, the number of target pulses with respect to the corresponding water supply amount stored in the storage unit is adjusted to be increased (step S40), and when the actual water supply amount is larger than the target water supply amount, the number of target pulses with respect to the corresponding water supply amount stored in the storage unit is adjusted to be decreased (step S41).

This process may be repeatedly performed, and when the actual water supply amount is equal to the target water supply amount, the correction mode select button 144c may be pressed to terminate the correction mode (step S42). In FIG. 8, the correction operations are performed with respect to the two types of water supply amounts of 200 ml and 400 ml, but the disclosed techniques are not meant to be limited thereto and the correction operation may be performed with respect to every water supply amount that can be selected.

Figure 9:
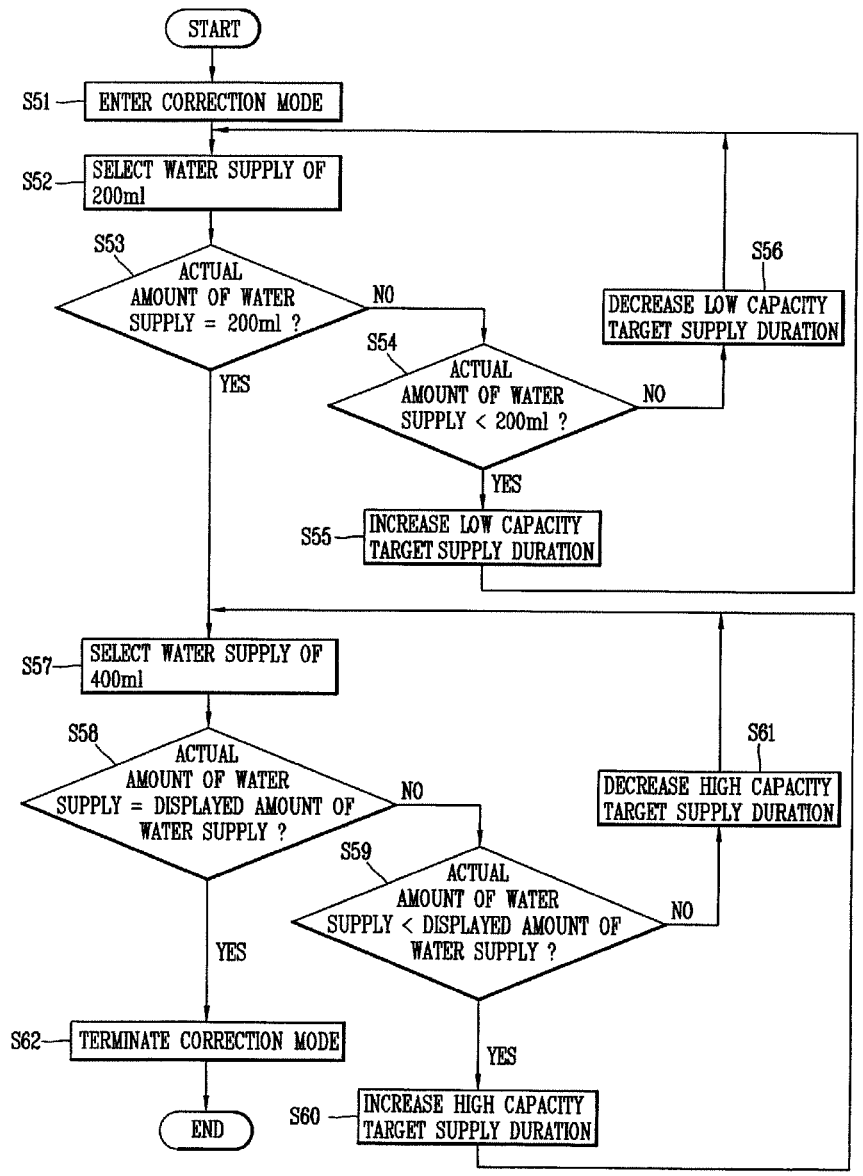
FIG. 9 is a flow chart illustrating still another example of a process of correcting a water supply amount of the refrigerator illustrated in FIG. 1.

Meanwhile, besides the pulse signals from the flow sensor, the water supply amount may be controlled through time required for water supply. FIG. 9 is a flow chart illustrating still another example of a process of correcting a water supply amount of the refrigerator illustrated in FIG. 1. In FIG. 9, information regarding time required for reaching each water supply amount, instead of the number of pulse signals with respect to each water supply amount, is stored in the storage unit. The information regarding the required time may be previously set in manufacturing the refrigerator, but may be corrected through the correction process illustrated in FIG. 9.

With reference to FIG. 9, when the correction mode select button 144c is pressed by the user, the controller enters the correction mode for changing the target pulse value stored in the storage unit (step S51).

In this state, when the user selects one of the selectable water supply amounts (200 ml in FIG. 9) (step S52), the controller performs water supply on the basis of the information regarding a required time stored in the storage unit. Thereafter, the actual water supply amount and the target water supply amount are compared (steps S53 and S54). When the actual water supply amount is smaller than the target water supply amount, the required time with respect to the corresponding water supply amount stored in the storage unit is adjusted to be increased (step S55), and when the actual water supply amount is larger than the target water supply amount, the required time with respect to the corresponding water supply amount stored in the storage unit is adjusted to be decreased (step S56).

This process may be repeatedly performed, and when the actual water supply amount is equal to the target water supply amount and the user selects one of the selectable water supply amounts (400 ml in FIG. 9) (step S57), the controller performs water supply on the basis of the information stored in the storage unit. Thereafter, the actual water supply amount and the target water supply amount are compared (steps S58 and S59). When the actual water supply amount is smaller than the target water supply amount, the required time with respect to the corresponding water supply amount stored in the storage unit is adjusted to be increased (step S60), and when the actual water supply amount is larger than the target water supply amount, the required time with respect to the corresponding water supply amount stored in the storage unit is adjusted to be decreased (step S61).

This process may be repeatedly performed, and when the actual water supply amount is equal to the target water supply amount, the correction mode select button 144c may be pressed to terminate the correction mode (step S62). In FIG. 9, the correction operations are performed with respect to the two types of water supply amounts of 200 ml and 400 ml, but the disclosed techniques are not meant to be limited thereto and the correction operation may be performed with respect to every water supply amount that can be selected.

Figure 10:
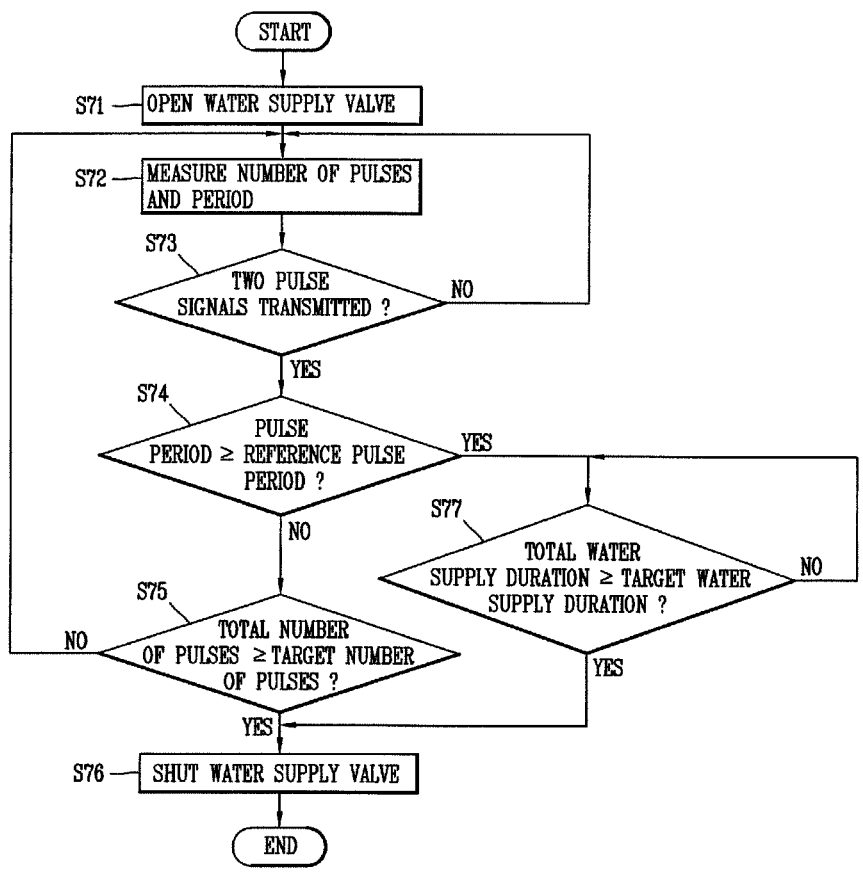
FIG. 10 is a flow chart illustrating the process of a method for controlling a water supply amount of the refrigerator illustrated in FIG. 1.

FIG. 10 is a flow chart illustrating the process of a method for controlling a water supply amount of the refrigerator illustrated in FIG. 1. With reference to FIG. 10, when the water supply amount select button or the switch 155 is pressed, the controller opens the water supply valve 170 to start water supply (step S71). When water supply stats, pulse signals are transmitted from the flow sensor, and the controller measures the number of transmitted pulse signals and a corresponding required time to measure the period of the pulse signals (step S72).

In this case, the period is calculated on the basis of two pulse signals which are successively transmitted, and measured immediately when water supply starts. After checking whether or not two pulse signals have been transmitted (step S73), the measured period of the pulse signals is compared with the reference pulse period (here, it is set to 100 ms, but this value may be appropriately changed in consideration of the diameter or a water pressure of the water supply flow path) for detecting whether or not there is an error (step S74). When the actual pulse period is smaller than the reference pulse period, it means that the flow sensor normally operates, so the number of target pulses for reaching the selected water supply amount and the number of actually transmitted pulses (step S75).

When the number of actually transmitted pulse signals is smaller than the number of the target pulse signals, because it means that water by the amount selected by the user has not been supplied, so the process is returned to step S72 and steps S72 to S75 are repeatedly performed. When the number of actually transmitted pulse signals is equal to or larger than the number of target pulse signals, because it means that water by the selected amount has been supplied, so the water supply valve is shut (step S76) and the water supply is terminated.

According to the foregoing process, because the steps S72 to S75 are repeatedly performed until when the water supply is terminated, whether or not the flow sensor has an error is continuously checked in the course of water supply, and because whether or not the flow sensor has an error can be determined at the initial stage of water supply, namely, at the point in time when the two pulse signals are transmitted, the situation can be rapidly coped with. Here, it is described that the period is measured by using two pulses, but the disclosed techniques are not limited thereto. Namely, an average pulse period may be measured by using two or more pulse signals and compared with the reference pulse period to check whether or not the flow sensor has an error.

In addition, step S74 of checking whether or not the flow sensor has an error may include a step of comparing deviations between the measured pulse periods when the pulse period is smaller than the reference pulse period. Namely, a water pressure of water supplied in the normal state is generally uniformly maintained, so the repeatedly measured pulse periods have substantially similar values. Thus, if a pulse period measured in a particular step is much different from the previously measured periods, it may be determined that the flow sensor has an error temporarily.

Meanwhile, when it is determined that the flow sensor has an error in step S74, the water supply amount cannot be measured on the basis of pulse signals. In this case, time required starting from a point in time when the water supply valve is open is measured, and the measured water supply duration is compared with a water supply duration stored in the storage unit to determine whether or not water by the selected water supply amount has been supplied (step S77).

Accordingly, even when the flow sensor has an error, water can be normally supplied. Here, when the flow sensor has an error, step S77 may not be performed and water supply may be stopped in step S76. In addition, when it is determined that the flow sensor has an error, information indicating that the flow sensor has an error may be provided to the user through a display window 142 provided to the manipulation panel 140.

Figure 11:
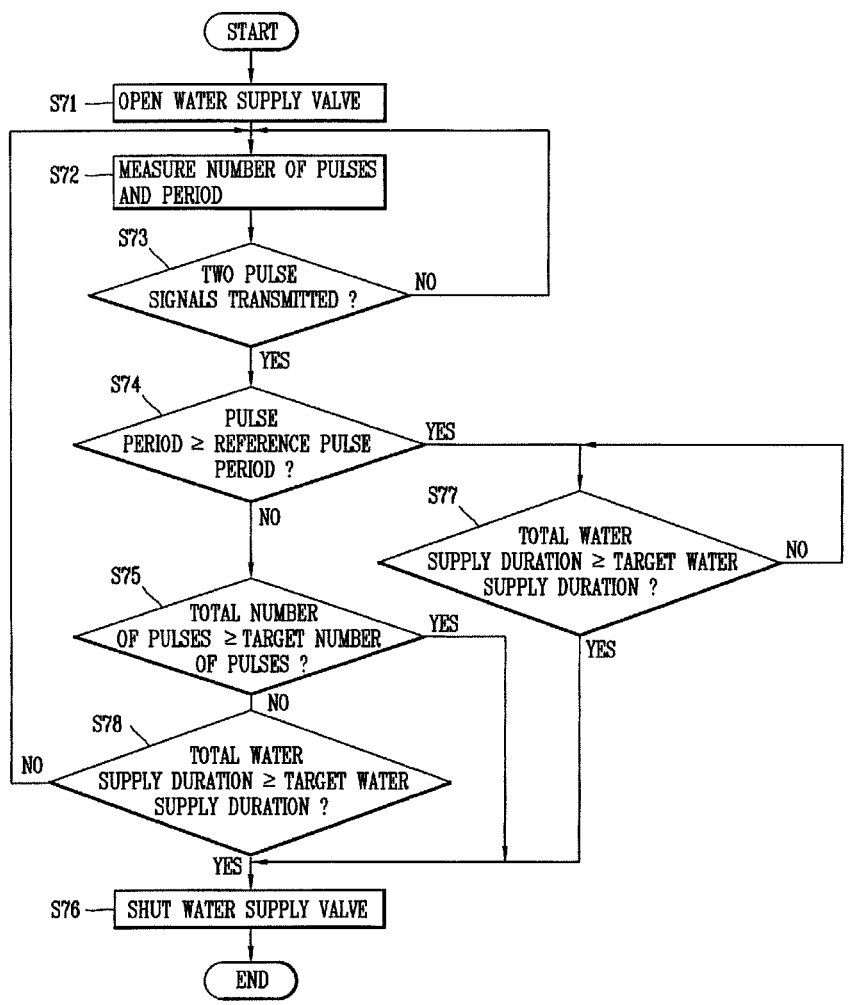
FIG. 11 is a flow chart illustrating another example of a process of a method for controlling a water supply amount of the refrigerator illustrated in FIG. 1

FIG. 11 is a flow chart illustrating another example of a process of a method for controlling a water supply amount of the refrigerator illustrated in FIG. 1. The case illustrated in FIG. 11 commonly performs steps S71 to S77 illustrated in FIG. 10, so a repeated description thereof will be omitted. With reference to FIG. 11, step S78 of comparing a water supply duration required after the water supply valve is open and the water supply duration stored in the storage unit, after the step S75 of checking a water supply amount, is additionally performed.

This is to cope with a potential situation in which water supply is not actually made due to a fault or the like of the device even when the number of actually measured pulse signals is smaller than the number of target pulse signals according to their comparison. Namely, in determining the water supply amount, the water supply duration is also checked as well as the pulse signals, so when any one of the both cases is satisfied, it may be determined that water supply has been completed so water supply is terminated, and when both cases are not satisfied, it may be determined that the actual water supply amount does not reach the target water supply amount, so the entire process is repeatedly performed.

Accordingly, the water supply amount can be more accurately performed. Like the case illustrated in FIG. 10, in the case illustrated in FIG. 11, when the flow sensor has an error, water supply may be immediately terminated or the deviations between the measured pulse periods may be considered in determining whether or not the flow sensor has an error.

As the disclosed techniques may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for controlling a water supply amount in a refrigerator comprising:
receiving a target water supply amount;
initiating a water supply device to supply water based on the target water supply amount;
beginning to count a water supply duration for which the water supply device supplies the target water supply amount;
determining whether a water supply amount measurement unit is operating normally, the water supply amount measurement unit being configured to measure an amount of water supplied by the water supply device;
in response to a determination that the water supply amount measurement unit is operating normally:
determining a measured water supply amount based on a signal from the water supply amount measurement unit,
comparing the determined measured water supply amount to the target water supply amount;
determining whether the measured water supply amount meets the target water supply amount based on comparison results; and
in response to a determination that the measured water supply amount meets the target water supply amount, stopping the water supply device from supplying water based on the target water supply amount and storing a signal from the water supply amount measurement unit and information regarding a water supply duration; and
in response to a determination that the water supply amount measurement unit is operating abnormally:
deriving a target water supply duration based on the target water supply amount and a correlation between stored water supply amount information and stored water supply duration information,
comparing the counted water supply duration to the derived target water supply duration;
determining whether the counted water supply duration meets the derived target water supply duration based on comparison results; and
in response to a determination that the counted water supply duration meets the target water supply duration, stopping the water supply device from supplying water based on the target water supply amount.

2. The method of claim 1:
wherein the water supply amount measurement unit is configured to generate a pulse signal,
wherein a frequency of the pulses in the generated pulse signal is proportional to a flow velocity of the supplied water, and
wherein determining the measured water supply amount based on the signal from the water supply amount measurement unit comprises determining the measured water supply amount based on a number of pulses generated by the water supply amount measurement unit.

3. The method of claim 2, wherein determining whether the water supply amount measurement unit is operating normally further comprises detecting presence or absence of the pulse signal.

4. The method of claim 3, wherein determining whether the water supply amount measurement unit is operating normally further comprises: counting a number of pulses generated by the water supply amount measurement unit; and
comparing the counted number of pulses to a target number.

5. The method of claim 1, wherein determining whether the water supply amount measurement unit is operating normally further comprises:
measuring a period of a pulse signal generated by the water supply amount measurement unit; and
comparing the measured period of the pulse signal to a pre-set reference pulse period.

6. The method of claim 5, wherein measuring the period of the pulse signal comprises measuring the period of the pulse signal based on a specific number of successively transmitted pulses.

7. The method of claim 6, wherein measuring the period of the pulse signal comprises measuring the period of the pulse signal based on two successively transmitted pulse signals.

8. The method of claim 5, wherein measuring the period of the pulse signal and comparing the measured period to the pre-set reference pulse period are repeatedly performed until water supply stops.

9. The method of claim 5, wherein measuring the period of the pulse signal and comparing the measured period to the pre-set reference pulse period are repeatedly performed at specific time intervals.

10. The method of claim 1, wherein deriving the target water supply duration comprises deriving the target water supply duration only based on the target water supply amount and a correlation between water supply amount information and water supply duration information that was stored within a specific number of days prior to the derivation.

11. The method of claim 1, wherein the water supply amount measurement unit is configured to generate a pulse signal and wherein the information stored after the water supply is stopped comprises a number of pulses generated by the water supply amount measurement unit between the initiation and the stopping of the water supply.

12. The method of claim 1, wherein the target water supply amount is received by a user.

13. The method of claim 12, wherein the user selects a button on a manipulation panel installed at an upper portion of a dispenser unit, to select the target water supply amount.

14. The method of claim 1, wherein deriving a target water supply duration based on the target water supply amount and a correlation between stored water supply amount information comprises:

deriving a target water supply duration based on the target water supply amount and an average value of ratios between the water supply amounts and the water supply durations.

15. The method of claim 1, wherein deriving a target water supply duration based on the target water supply amount and a correlation between stored water supply amount information comprises:

deriving a target water supply duration based on the target water supply amount and an estimation calculated by utilizing the method of least squares statistical scheme.

* * * * *